(12) United States Patent
Waxman et al.

(10) Patent No.: US 8,229,996 B2
(45) Date of Patent: Jul. 24, 2012

(54) ASYNCHRONOUS PROCESSING OF TASK COMPONENTS IN CONNECTION WITH RIGHTS MANAGEMENT SYSTEM AND THE LIKE

(75) Inventors: Peter Waxman, Bellevue, WA (US); Scott Cottrille, Sammamish, WA (US); Vladimir Yarmolenko, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 2307 days.

(21) Appl. No.: 10/723,825

(22) Filed: Nov. 26, 2003

(65) Prior Publication Data

US 2005/0114440 A1 May 26, 2005

(51) Int. Cl.
*G06F 15/16* (2006.01)
(52) U.S. Cl. ......................................... 709/201
(58) Field of Classification Search ................... 709/201
See application file for complete search history.

(56) References Cited

U.S. PATENT DOCUMENTS

| | | | |
|---|---|---|---|
| 6,336,135 B1* | 1/2002 | Niblett et al. | 709/215 |
| 6,718,361 B1* | 4/2004 | Basani et al. | 709/201 |
| 7,353,402 B2 | 4/2008 | Bourne et al. | |
| 7,549,060 B2 | 6/2009 | Bourne et al. | |
| 7,891,007 B2 | 2/2011 | Waxman et al. | |
| 2003/0041147 A1* | 2/2003 | van den Oord et al. | 709/227 |

\* cited by examiner

*Primary Examiner* — William Goodchild
(74) *Attorney, Agent, or Firm* — Woodcock Washburn LLP

(57) ABSTRACT

A server receives a request and identifies a corresponding task with core and peripheral components. The server performs the core components and collects relevant context data. The server returns a result to the requester based on having performed the core components, and constructs a message including the collected context data and sends same to an asynchronous message collector. An asynchronous message processor takes up and processes the message from the collector to perform the peripheral components. Thus, the message processor performs less-time-sensitive peripheral work independent of the server and allows the server to attend to more-time-sensitive core work.

30 Claims, 4 Drawing Sheets

ASYNCHRONOUS PROCESSING OF TASK COMPONENTS IN CONNECTION WITH RIGHTS MANAGEMENT SYSTEM AND THE LIKE

TECHNICAL FIELD

The present invention relates to an architecture and method for asynchronously processing task components in connection with a rights management system. More particularly, the present invention relates to such an architecture and method whereby a rights management server processes core task components and forwards peripheral task components elsewhere for later processing.

BACKGROUND OF THE INVENTION

As is known, and referring now to FIG. 1, a rights management (RM) and enforcement system is highly desirable in connection with digital content 12 such as digital audio, digital video, digital text, digital data, digital multimedia, etc., where such digital content 12 is to be distributed to users. Upon being received by the user, such user renders or 'plays' the digital content with the aid of an appropriate rendering device such as a media player on a personal computer 14, a portable playback device or the like.

Typically, a content owner distributing such digital content 12 wishes to restrict what the user can do with such distributed digital content 12. For example, the content owner may wish to restrict the user from copying and re-distributing such content 12 to a second user, or may wish to allow distributed digital content 12 to be played only a limited number of times, only for a certain total time, only on a certain type of machine, only on a certain type of media player, only by a certain type of user, etc.

However, after distribution has occurred, such content owner has very little if any control over the digital content 12. An RM system 10, then, allows the controlled rendering or playing of arbitrary forms of digital content 12, where such control is flexible and definable by the content owner of such digital content. Typically, content 12 is distributed to the user in the form of a package 13 by way of any appropriate distribution channel. The digital content package 13 as distributed may include the digital content 12 encrypted with a symmetric encryption/decryption key (KD), (i.e., (KD(CONTENT))), as well as other information identifying the content, how to acquire a license for such content, etc.

The trust-based RM system 10 allows an owner of digital content 12 to specify rules that must be satisfied before such digital content 12 is allowed to be rendered. Such rules can include the aforementioned requirements and/or others, and may be embodied within a digital license 16 that the user/user's computing device 14 (hereinafter, such terms are interchangeable unless circumstances require otherwise) must obtain from the content owner or an agent thereof, or such rules may already be attached to the content 12. Such license 16 may for example include the decryption key (KD) for decrypting the digital content 12, perhaps encrypted according to another key decryptable by the user's computing device or other playback device. Because the content 12 can only be rendered in accordance with the rules in the license 16, then, the content 12 may be freely distributed.

The content owner for a piece of digital content 12 would prefer not to distribute the content 12 to the user unless such owner can trust that the user will abide by the rules specified by such content owner in the license 16 or elsewhere. Preferably, then, the user's computing device 14 or other playback device is provided with a trusted component or mechanism 18 that will not render the digital content 12 except according to such rules.

The trusted component 18 typically has an evaluator 20 that reviews the rules, and determines based on the reviewed rules whether the requesting user has the right to render the requested digital content 12 in the manner sought, among other things. As should be understood, the evaluator 20 is trusted in the DRM system 10 to carry out the wishes of the owner of the digital content 12 according to the rules, and the user should not be able to easily alter such trusted component 18 and/or the evaluator 20 for any purpose, nefarious or otherwise.

As should be understood, the rules for rendering the content 12 can specify whether the user has rights to so render based on any of several factors, including who the user is, where the user is located, what type of computing device 14 or other playback device the user is using, what rendering application is calling the RM system 10, the date, the time, etc. In addition, the rules may limit rendering to a pre-determined number of plays, or pre-determined play time, for example.

The rules may be specified according to any appropriate language and syntax. For example, the language may simply specify attributes and values that must be satisfied (DATE must be later than X, e.g.), or may require the performance of functions according to a specified script (IF DATE greater than X, THEN DO . . . , e.g.).

Upon the evaluator 20 determining that the user satisfies the rules, the digital content 12 can then be rendered. In particular, to render the content 12, the decryption key (KD) is obtained from a pre-defined source and is applied to (KD (CONTENT)) from the content package 13 to result in the actual content 12, and the actual content 12 is then in fact rendered.

Oftentimes, the RM system 10 extends from the computing device 14 to one or more RM servers 22 that provide information, elements, and services in connection with the trusted component 18 and other RM elements on the computing device 14. For example, the trusted component 18 itself may be obtained from one such RM server 22, while licenses 16 may be obtained from another RM server 22, and content 12 may be protected with the aid of another RM server 22. Moreover, such one or more RM servers 22 may be employed to enroll users and/or computing devices 14 into the RM system 10, perhaps by way of issuance of a certificate or the like, or may be employed to give certain users special publishing rights, again perhaps by way of issuance of a certificate or the like.

Further, and as seen in FIG. 1, each RM server 22 that interfaces with a computing device 14 of a user may in turn interface with another RM server 22, perhaps to be enrolled into the RM system 10 once again perhaps by way of issuance of a certificate or the like. In short, it is to be appreciated that a veritable constellation of RM servers 22 can be employed in the RM system 10 to effectuate functions for such RM system 10 including those set forth above and others. An example of an RM system 10 employing such RM servers 22 is set forth in U.S. patent application Ser. Nos. 10/185,527, 10/185,278, and 10/185,511, each filed Jun. 28, 2002 and incorporated by reference in its entirety.

In general, and as should be appreciated, each RM server 22 in operation receives a request from a client such as a trusted component 18 on a computing device 14, another RM server 22, or the like, and in response to the request performs a task and then returns a result to the requesting client. Of course, the client request can vary from RM server 22 to RM server 22, or can be one of multiple types of client request directed to and handled by a particular RM server 22, or the like. As was alluded to above, and as should also be appreciated, typical tasks performed by an RM server 22 in response to a client request can include but are not limited to licensing, certification, activation, enrollment, publishing, and the like.

The task corresponding to any particular client request can and likely does have multiple task components. For example, a client request for a license 16 could result in a licensing task with components including parsing, request validation, policy validation, directory cross-referencing, business logic, billing, subscription maintenance, surveillance, logging, and the like. Significantly, such task components can be divided into core task components that must be completed before a decision is made on whether to honor the request, and peripheral task components that can be completed after a decision is made on whether to honor the request. For example, and with regard to the aforementioned client request for a license 16, parsing, request validation, policy validation, directory cross-referencing, and business logic could be core components of such request, and billing, subscription maintenance, surveillance, and logging could be peripheral components of such request.

In the context of an especially active environment, it can be the case that an engaged RM server 22 having to respond to multiple requests cannot do so in a reasonable period of time due to the number of corresponding task components that must be performed and/or the amount of time necessary to perform such task components. Likewise, in the context of any environment active or inactive, it can be the case that an engaged RM server 22 having to respond to a single request likewise cannot do so in a reasonable period of time due to the number of corresponding task components that must be performed and/or the amount of time necessary to perform such task components.

Accordingly, a need exists for an architecture and method that allows an RM server 22 to perform core task components relating to a request in a synchronous manner and to adjourn peripheral task components relating to the request to be performed elsewhere in an asynchronous manner. More particular, a need exists for such an architecture and method that allows the RM server 22 to perform the core task components prior to responding to the request and to pass the peripheral task components to one or more queues to be taken up prior to or after the request has been responded to as circumstances allow.

SUMMARY OF THE INVENTION

The aforementioned needs are satisfied at least in part by the present invention in which a method is disclosed for a computer server to respond to a request from a client. The server receives the request from the client and identifies a task corresponding to the request. The identified task includes a set of core task components and a set of peripheral task components, where the core task components include task components that must be completed before a decision is made on whether to honor the request, and the peripheral task components include task components that can be completed after a decision is made on whether to honor the request.

The server responds to the request by performing the core task components of the identified task, and also collecting request context data relevant to the request and the identified task. The server returns a result to the requesting client based on having performed the core task components of the identified task, and constructs a message to include the collected request context data and the returned results and sends the constructed message to an asynchronous message collector. An asynchronous message processor takes up and processes the message from the collector to perform one or more peripheral task components of the identified task based on the message. Thus, the message processor performs less-time-sensitive peripheral work independent of the server and allows the server to attend to more-time-sensitive core work.

BRIEF DESCRIPTION OF THE DRAWINGS

The foregoing summary, as well as the following detailed description of the embodiments of the present invention, will be better understood when read in conjunction with the appended drawings. For the purpose of illustrating the invention, there are shown in the drawings embodiments which are presently preferred. As should be understood, however, the invention is not limited to the precise arrangements and instrumentalities shown. In the drawings.

DETAILED DESCRIPTION OF THE INVENTION

Computer Environment

Figure 1:
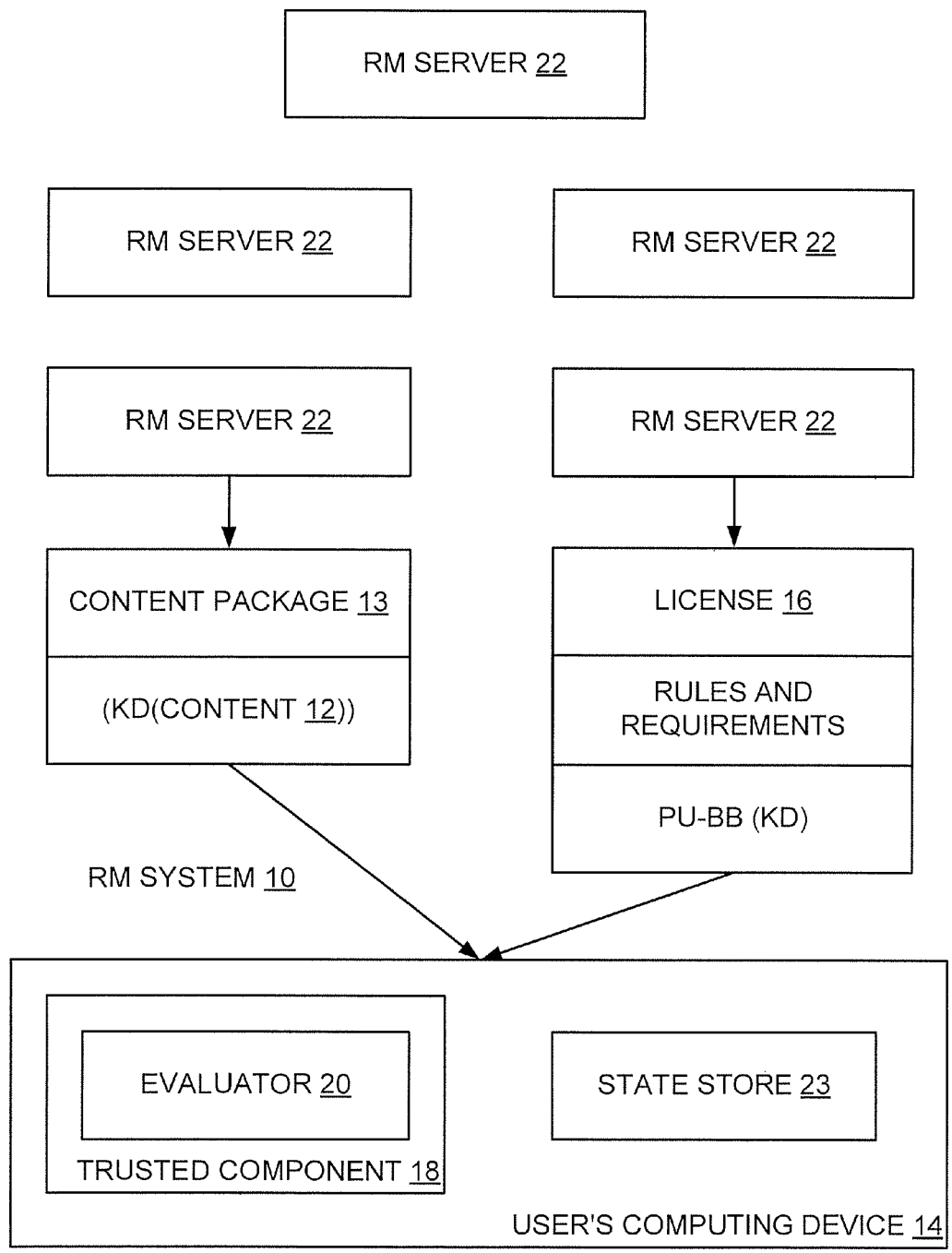
FIG. 1 is a block diagram showing an enforcement architecture of an example of a trust-based system, including an RM server performing RM services for a requesting client at a computing device.

FIG. 1 and the following discussion are intended to provide a brief general description of a suitable computing environment in which the present invention and/or portions thereof may be implemented. Although not required, the invention is described in the general context of computer-executable instructions, such as program modules, being executed by a computer, such as a client workstation or a server. Generally, program modules include routines, programs, objects, components, data structures and the like that perform particular tasks or implement particular abstract data types. Moreover, it should be appreciated that the invention and/or portions thereof may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

Figure 2:
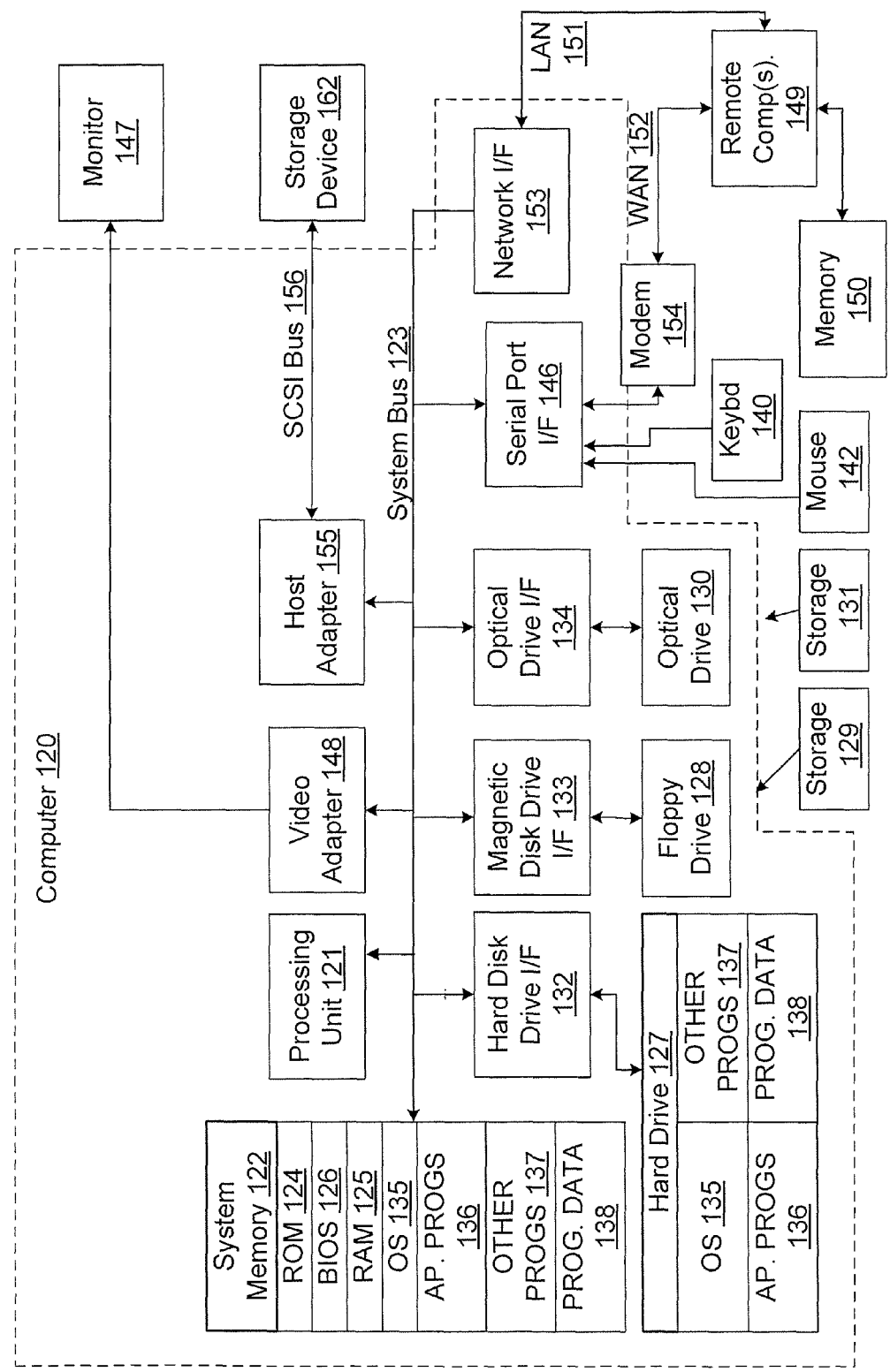
FIG. 2 is a block diagram representing a general purpose computer system in which aspects of the present invention and/or portions thereof may be incorporated.

As shown in FIG. 2, an exemplary general purpose computing system includes a conventional personal computer 120 or the like, including a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read-only memory (ROM) 124 and random access memory (RAM) 125. A basic input/output system 126 (BIOS), containing the basic routines that help to transfer information between elements within the personal computer 120, such as during start-up, is stored in ROM 124.

The personal computer 120 may further include a hard disk drive 127 for reading from and writing to a hard disk (not shown), a magnetic disk drive 128 for reading from or writing to a removable magnetic disk 129, and an optical disk drive 130 for reading from or writing to a removable optical disk 131 such as a CD-ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide non-volatile storage of computer readable instructions, data structures, program modules and other data for the personal computer 120.

Although the exemplary environment described herein employs a hard disk, a removable magnetic disk 129, and a removable optical disk 131, it should be appreciated that other types of computer readable media which can store data that is accessible by a computer may also be used in the exemplary operating environment. Such other types of media include a magnetic cassette, a flash memory card, a digital video disk, a Bernoulli cartridge, a random access memory (RAM), a read-only memory (ROM), and the like.

A number of program modules may be stored on the hard disk, magnetic disk 129, optical disk 131, ROM 124 or RAM 125, including an operating system 135, one or more application programs 136, other program modules 137 and program data 138. A user may enter commands and information into the personal computer 120 through input devices such as a keyboard 140 and pointing device 142. Other input devices (not shown) may include a microphone, joystick, game pad, satellite disk, scanner, or the like. These and other input devices are often connected to the processing unit 121 through a serial port interface 146 that is coupled to the system bus, but may be connected by other interfaces, such as a parallel port, game port, or universal serial bus (USB). A monitor 147 or other type of display device is also connected to the system bus 123 via an interface, such as a video adapter 148. In addition to the monitor 147, a personal computer typically includes other peripheral output devices (not shown), such as speakers and printers. The exemplary system of FIG. 2 also includes a host adapter 155, a Small Computer System Interface (SCSI) bus 156, and an external storage device 162 connected to the SCSI bus 156.

The personal computer 120 may operate in a networked environment using logical connections to one or more remote computers, such as a remote computer 149. The remote computer 149 may be another personal computer, a server, a router, a network PC, a peer device or other common network node, and typically includes many or all of the elements described above relative to the personal computer 120, although only a memory storage device 150 has been illustrated in FIG. 2. The logical connections depicted in FIG. 2 include a local area network (LAN) 151 and a wide area network (WAN) 152. Such networking environments are commonplace in offices, enterprise-wide computer networks, intranets, and the Internet.

When used in a LAN networking environment, the personal computer 120 is connected to the LAN 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

Asynchronously Processing Peripheral Task Components

In the present invention, an RM server 22 in operation receives a request from a client such as a trusted component 18 on a computing device 14, and in response to the request performs a task and then returns a result to the requesting client. The client request and the corresponding task can be any client request and task without departing from the spirit and scope of the present invention. For example, such tasks can include but are not limited to licensing, certification, activation, enrollment, publishing, and the like. As may be appreciated, such client requests and tasks are known or should be apparent to the relevant public and therefore need not be set forth herein in any detail.

Presumably, each has multiple task components, each of which can be any component without departing from the spirit and scope of the present invention. For example, such components can include but are not limited to parsing, request validation, policy validation, directory cross-referencing, business logic, billing, subscription maintenance, surveillance, logging, and the like. As may be appreciated, such components are known or should be apparent to the relevant public and therefore need not be set forth herein in any detail.

In one embodiment of the present invention, the components of a task are divided into core task components that must be completed before a decision is made on whether to honor the request, and peripheral task components that can be completed after a decision is made on whether to honor the request. Such division can be made on any appropriate basis without departing from the spirit and scope of the present invention. For example, core components could include those that are absolutely necessary to be performed prior to responding to the corresponding request, perhaps other low-bandwidth tasks that should not adversely impact response time, and perhaps other tasks that for policy reasons are to be performed only by the RM server 22, while peripheral components are all other task components.

Put another way, core components could include those that are to be performed by the RM server 22 synchronously with regard to responding to the request, while peripheral components could include those that can be performed by another element asynchronously with regard to responding to the request. As should be appreciated, asynchronous processing in the RM server 22 addresses the problem of performing time-consuming operations as a result of normal rights management request processing, especially when such time-consuming operations are not critical to the primary function of generating a response to a request. Such asynchronous processing of peripheral task components in connection with the RM server 22 leaves the RM server 22 to perform the core task components synchronously and thereby process client requests more quickly. Thus, the non-critical peripheral task components are removed as an impediment from such quick client request processing.

Figure 3:
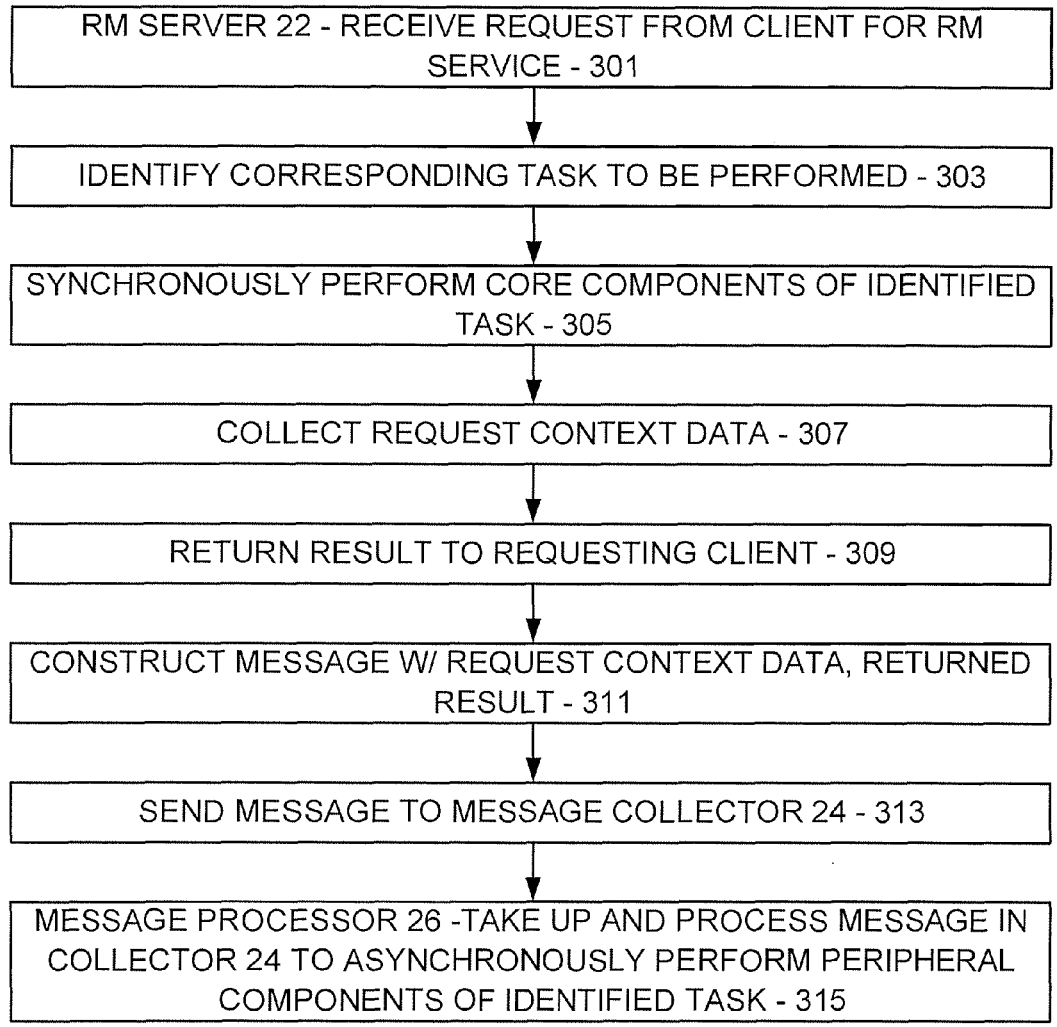
FIG. 3 is a flow diagram showing key steps performed by the RM server of FIG. 1 in receiving and responding to a request from the client.
Figure 4:
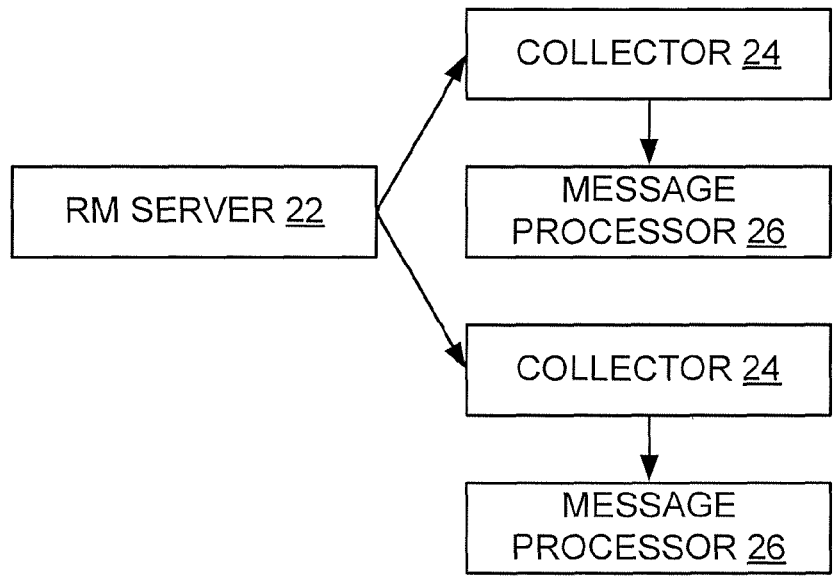
FIGS. 4 and 5 are block diagrams showing variations of architectures of message processors receiving messages from the RM server of FIG. 1, where the RM server performs core task components associated with the received request and the message processor performs peripheral task components associated with the received request.

In one embodiment of the present invention, and with reference to FIG. 3, the RM server 22 receives a request from a client for an RM service (step 301) and identifies the corresponding task that is to be performed in response thereto (step 303). Presumably, and again, for the identified task a set of core task components and a set of peripheral task components have been in turn identified, and thus the RM server responds to the request by in particular performing the identified core components of the identified task corresponding to the client request (step 305). Notably, in doing so, the RM server 22 collects request context data from multiple sources, including input parameters on the request, server configuration data, policy from various sources, and algorithmic data generated as a result of processing all of the aforementioned sources (step 307). Thereafter, the RM server 22 returns a result to the requesting client as appropriate based on having performed the core task components (step 309).

In one embodiment of the present invention, the request context data is collected and organized according to a pre-defined schema such as that set forth below in the Appendix. Accordingly, and as should be appreciated, the data can be interpreted according to the schema by one or more recipients thereof as will be set forth in more detail below. Such schema may be any appropriate schema without departing from the spirit and scope of the present invention. For example, such schema can be proprietary in nature if all recipients are within the same organization, or can be based on a standard if recipients are inter-organizational in nature. Also, in one embodiment of the present invention, the RM server 22 collects the request context data according to pre-defined logic such that the request context data is relevant to the identified task and the identified and performed core task components.

Significantly, along with returning the result to the requesting client, the RM server 22 constructs a message to include the collected request context data and the returned results (step 311). As should be appreciated, such a message will be the basis for other elements to perform the peripheral components of the task corresponding to the client request. In one embodiment of the present invention, the RM server 22 then sends such message to one or more asynchronous message collectors 24 (step 313), each of which is essentially a queue or other redistribution point from which each message therein is taken up in turn. As may be appreciated, the schema of the message and the protocol for sending such message may be any appropriate schema and protocol without departing from the spirit and scope of the present invention, such as that set forth below in the Appendix, although it is to be appreciated that the protocol in particular should be a reliable message technology protocol to ensure delivery of the message to the one or more collectors.

Each type of request to an RM server 22 generates a message with a different type of collected request context therein. For example, a licensing request may result in a message with properties A, B and C while an enrollment request may result in a message with properties B, D and E. As should be appreciated, the nature of the request determines the context therein. Thus, all requests of a single type should result in a message having a single type of context therein, although of course the data of such context differs from message to message.

Each message collector 24 again is essentially a queue from which each message therein is taken up in turn. Thus, each message collector 24 stores each received message from each of one or more RM servers 22 until the received messages can be taken up, processed and removed from the collector 24. In one embodiment of the present invention, each message in a collector 24 is taken up and processed by an associated message processor 26 (step 315). As may be appreciated, each collector 24 may have a single message processor 26 associated therewith or may have a cluster of such message processors 26 associated therewith, and each message processor 26 may likewise have one or more collectors 24 associated therewith. Thus, any appropriate arrangement of collectors 24 and message processors 26 may be employed without departing from the spirit and scope of the present invention.

As should be appreciated, each message processor 26 is responsible for removing a message from a collector 24, parsing the message, and performing one or more peripheral task components based on the contents of the message. Examples of such performed peripheral components include logging the contents of the message to a database for intellectual property tracking within an enterprise, billing an account for content rights purchased, beginning a subscription notification cycle for content rights purchased, notifying an external content surveillance company that rights to a piece of content have been assigned so that the surveillance company can begin monitoring for leaks of such content, and the like. As should be appreciated, and again, such peripheral components are in the nature of actions that need to be performed in connection with a client request, but not necessarily before the RM server 22 returns a result in connection with such client request.

Remembering that the RM server 22 collected the request context data according to pre-defined logic such that the request context data is relevant to the identified task and the identified and performed core task components, it is to be appreciated that in one embodiment of the present invention the request context data as set forth by the RM server 22 defines the peripheral task components performed by the message processor 26, presuming of course that the message processor 26 is in fact capable of performing such peripheral task components. Thus, if the message includes data relevant to peripheral task components A, B, and D and does not include data relevant to peripheral task component C, the message collector 26 will perform peripheral task components A, B, and D only, and will not perform peripheral task component C.

As should be appreciated, and in one embodiment of the present invention, each message processor 26 implements one or more peripheral task components, simple or complex, and consumes from a collector 24 an asynchronously sent message. Thus, each message processor 24 off-loads work from an RM server 22 and allows such RM server 22 to attend to more critical core task components, thus extending the value of such RM server 22. Especially for processing that involves high latency or high computational expenses, each message processor 26 provides a benefit by performing such processing apart from the processing that must be performed quickly by the RM server 22. In contrast with the RM server 22, then, the message processor 26 can take as long as necessary.

Significantly, inasmuch as the RM server 22 need not wait for a message processor 26 to process a message, the RM server 22 performs processing independent of such message processor 26. Accordingly, the message processor 26 need not inform the RM server 22 when a message has been processed, although feedback to the RM server 22 may be provided as needed or as advisable.

Figure 5:
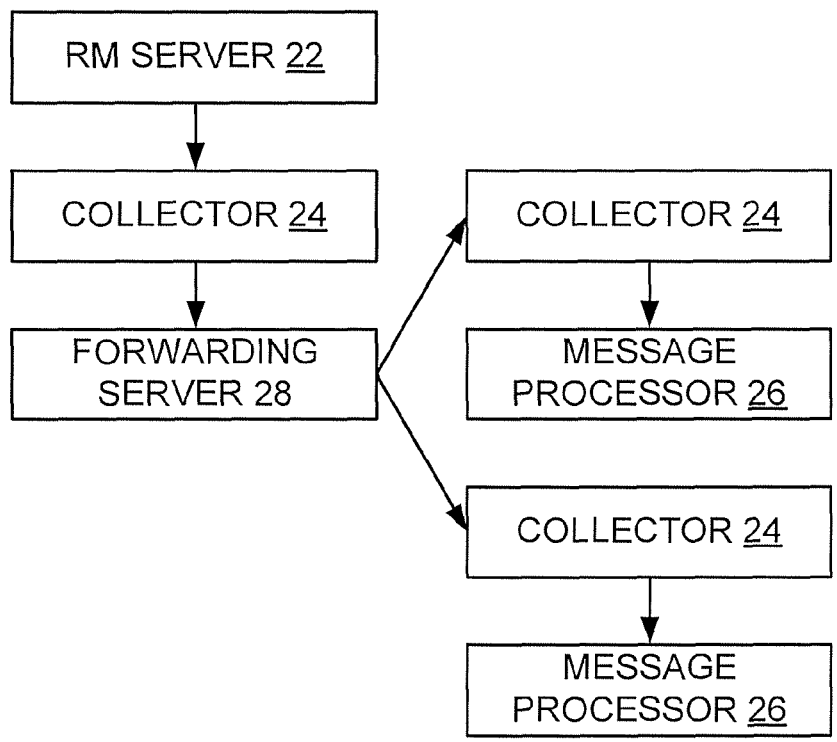

Note, though, that as the client request handling rate for an RM server 22 increases, so too does the asynchronous message rate from the RM server 22 increase. Thus, load balancing of asynchronous messages from an RM server 22 may be necessary. As seen in FIG. 5, such load balancing may be accomplished by a forwarding server 28 that receives messages from the RM server 24, that manages a plurality of message processors 26, and that distributes incoming messages to such message processors 26 according to a load balancing algorithm. As maybe appreciated, in such scenario, each of each message processor 26 and the forwarding server 28 may have a corresponding collector 24 from which received messages are queued and then taken up. Such load balancing may also be accomplished by the RM server 22 itself, in which case such RM server must have knowledge of the network of message processors 26 and perform the same load balancing algorithm as part of determining the location to send the message.

Note further that each message processor 26 may be an all-purpose processor capable of performing any necessary peripheral task component based on the message received, or may be a specific processor defined to handle one or more specific peripheral task components only and not any other peripheral task components. In the latter case, it may be necessary that the RM server 22 forward each message to a specific message processor 26 or cluster thereof based on the peripheral task components required to be performed, or that a forwarding server 28 such as that shown in FIG. 5 like-wise pre-screen each message prior to forwarding same to a specific message processor 26 or cluster thereof based on the peripheral task components required to be performed.

Also in the latter case, it may be necessary that the RM server 22 forward multiple copies of each message to multiple specific message processors 26 or clusters thereof based on the peripheral task components required to be performed, or that a forwarding server 28 such as that shown in FIG. 5 like-wise pre-screen each message prior to forwarding multiple copies of same to multiple specific message processor 26 or clusters thereof based on the peripheral task components required to be performed. Thus, if the message included information relating to peripheral task components A, B, C, and D it may be the case that a copy of such message would be delivered to each of a first message processor 26 that handles peripheral component A, a second message processor 26 that handles both peripheral components B and C, and a third message processor 26 that handles peripheral component D. Presumably, each message processor 26 or cluster thereof would include specific logic that handles only the corresponding peripheral component thereof as relating to the received message and not any other peripheral components.

Note that it may be the case that a message as sent from an RM server 22 to a collector 24 or from a forwarding server 28 to a collector 24 may be encrypted, especially in the case where the transmission path is not secure, where the message is sent between organizations, or any situation where the message may have sensitive information therein that could be exposed to a nefarious entity. If so, the sender of the message and the receiver thereof presumably share a secret such as a symmetric key or access to a public key, and have functionality necessary to encrypt/decrypt the message as necessary.

If exposure of the message is not a concern, but message integrity is in fact a concern, it may be the case that the message is digitally signed based on the content thereof and a secret shared between the sender of the message and the receiver thereof. Thus, and as should be appreciated, alteration of the message causes the digital signature to fail to verify. Again, such shared secret may be a symmetric key or access to a public key, such that the receiver of the message can apply the secret to the signature to confirm that the message has not been altered, and the sender and receiver each have functionality necessary to sign/verify the message as necessary.

Note that in a message processor 26, forwarding server 28, or the like taking up a message from a collector 24 as at step 315, the message is presumed by the collector 24 to be handled and is therefore deleted from the collector 24. However, it can be the case that for one reason or another the message taker fails to in fact handle the message. For example, the message taker may fail, or may decide that it cannot in fact handle the message. In such case, the message is placed back into the taken-from collector 24 for taking at a later time by the original message taker or by another message taker. Accordingly, the message is not lost and the peripheral task components associated therewith are in fact performed at some point.

Note, though, that other failed message processing schemes may be employed without departing from the spirit and scope of the present invention, provided of course that each message is not redundantly processed. For example, in addition to placing a failed message back into the collector 24 from whence such message came, the failed message could instead be placed into a failed message collector 24, another collector, or into storage for later processing.

CONCLUSION

The present invention may be practiced with regard to any particular arrangement of RM servers 22, collectors 24, message processors 26, forwarding servers 28, and the like. Accordingly, the present invention is to be interpreted to encompass any system wherein an RM server 22 or the like performs core task components in connection with a client request and forwards peripheral task components elsewhere to be performed asynchronously.

The programming necessary to effectuate the processes performed in connection with the present invention is relatively straight-forward and should be apparent to the relevant programming public. Accordingly, such programming is not attached hereto. Any particular programming, then, may be employed to effectuate the present invention without departing from the spirit and scope thereof.

In the foregoing description, it can be seen that the present invention comprises a new and useful architecture and method that allows an RM server 22 to perform core task components relating to a request in a synchronous manner and to adjourn peripheral task components relating to the request to be performed by a message processor 26 in an asynchronous manner. Thus, the RM server 22 performs the core task components prior to responding to the corresponding client request, and passes the peripheral task components to one or more collectors 24 to be taken up by a message processor 26 prior to or after the request has been responded to as circumstances allow.

It should be appreciated that changes could be made to the embodiments described above without departing from the inventive concepts thereof. It should be understood, therefore, that this invention is not limited to the particular embodiments disclosed, but it is intended to cover modifications within the spirit and scope of the present invention as defined by the appended claims.

APPENDIX

Schema of Asynchronous Message and Data Therein
Following is typical data that is put into a message:

| | |
|---|---|
| i_LogID | Unique ID for this logging record |
| s_HostMachineName | Server that generated this record |
| dt_RequestTime | Date & time of request |
| s_RequestPath | URL path of request |
| s_RequestType | Type of request |
| s_RequestUserAddress | IP address of client |

-continued

| | |
|---|---|
| s_RequestUserAgent | User agent header of client |
| s_AuthenticatedState | Is request Authenticated |
| s_SecureConnectionState | Is connection SSL protected |
| s_AuthenticatedId | ID of authenticated user |
| s_ReceivedXrML | XrML received from client |
| s_IssuedXrML | XrML License issued in request |
| s_Metadata | Metadata |
| s_SuccessOrFailure | "Success" or "Failure" |
| s_ErrorInformation | Any error data |

Additionally, there could be additional values depending on the request type.
  For Licensing request type:
  GroupIdentityCertificate
  GroupIdentities
  IssuanceLicense
  ApplicationData
  SSILCertificate
  For Publish request type:
  GroupIdentityCertificate
  For Certification request type:
  UserEmailAddress
  UserSID
  For Activation request type:
  HardwareID
  For Enrollment request type:
  Revocation Information
  X5091Information
  For Subenrollment request type:
  EnrolleeServerInformation
  EnrolleeCertificatePublicKey
  Data is placed into the message in namespace-name-value triplets such as:
  Namespace("Tungsten")
  Property Name("Requestid")
  Values("{7563411c-58b5-45ec-84b3-c7c3b855d660}0.1")
  Namespace("Tungsten")
  Property Name("RequestisAuthenticated")
  Values("False")
  Namespace("Tungsten")
  Property Name("RequestIsSecureConnection")
  Values("False")
  Namespace("Tungsten")
  Property Name("RequestPath")
  Values("/Tungsten/Server.asmx/GetLicensorCertificate")
  Namespace("Tungsten")
  Property Name("RequestUserAgent")
  Values("Mozilla/4.0 (compatible; MSIE 6.0; Windows NT 5.1; Q312461; .NET CLR 1.0.2914; NET CLR 1.0.3427)")
  Namespace("Tungsten")
  Property Name("RequestUserAddress")
  Values("127.0.0.1")

The invention claimed is:

1. A method comprising:
   a server receiving a request from a client;
   the server identifying a task corresponding to the request, the identified task including a set of core task components and a set of peripheral task components,
   the core task components identified on the basis of time available to the server for responding to a plurality of requests;
   the server responding to the request by performing the core task components of the identified task;
   the server collecting request context data relevant to the request and the identified task;
   the server returning a result to the requesting client based on having performed the core task components of the identified task;
   the server constructing a message to include the collected request context data and the returned results;
   the server sending the constructed message to an asynchronous message collector;
   the server sending the constructed message to a first asynchronous message collector;
   a forwarding server taking up the message from the first collector and forwarding same to one of a plurality of second asynchronous message collector based on a load balancing algorithm, each second collector having an asynchronous message processor associated therewith; and
   the asynchronous message processor associated with the sent-to second collector taking up and processing the message therefrom to perform one or more peripheral task components of the identified task based on the message.

2. The method of claim 1, wherein the request is a request for a license and the set of core components comprises a request validation.

3. The method of claim 2, wherein the set of core components further comprises parsing, and policy validation, and wherein the set of peripheral task components comprises billing and subscription maintenance.

4. The method of claim 1 further comprising the asynchronous message processor taking up and processing the message from the collector to perform one or more peripheral task components of the identified task based on the message.

5. The method of claim 1 further comprising the server identifying the task corresponding to the request, the identified task including core task components including task components identified as relatively low-bandwidth tasks that do not adversely impact response time.

6. The method of claim 1 further comprising the server identifying the task corresponding to the request, the identified task including peripheral task components including task components identified as relatively high-bandwidth tasks that could adversely impact response time.

7. The method of claim 1 further comprising the server collecting the request context data and organizing same according to a pre-defined schema recognizable to each message processor.

8. The method of claim 1 further comprising the server sending the constructed message to the asynchronous message collector according to a reliable message technology protocol to ensure delivery of the message to the collector.

9. The method of claim 1 further comprising one of a plurality of message processors associated with the collector taking up and processing the message from the collector.

10. The method of claim 1 further comprising the server collecting request context data defining the peripheral task components to be performed by the message processor, the message processor taking up and processing the message from the collector to perform the peripheral task components defined by the collected request context data of the message.

11. The method of claim 1 further comprising:
   the server sending the constructed message to one of a plurality of asynchronous message collectors, each collector having an asynchronous message processor associated therewith;
   the asynchronous message processor associated with the sent-to collector taking up and processing the message therefrom to perform one or more peripheral task components of the identified task based on the message.

12. The method of claim 1 further comprising:
the server sending the constructed message to a plurality of asynchronous message collectors, each collector having an asynchronous message processor associated therewith;
the asynchronous message processor associated with each sent-to collector taking up and processing the message therefrom to perform one or more peripheral task components of the identified task based on the message.

13. The method of claim 1 further comprising:
the server encrypting the constructed message and sending the encrypted message to the asynchronous message collector;
the asynchronous message processor taking up and decrypting the message from the collector and processing the decrypted message.

14. The method of claim 1 further comprising:
the server signing the constructed message and sending the signed message to the asynchronous message collector;
the asynchronous message processor taking up and verifying the signed message from the collector and processing the verified message.

15. The method of claim 1, wherein the method is for a rights management (RM) server in an RM system to respond to a request for an RM service from an RM client.

16. A computer-readable storage medium, wherein the storage medium is not a signal, the storage medium having stored thereon computer-executable instructions for performing operations comprising:
a server receiving a request from a client;
the server identifying a task corresponding to the request, the identified task including a set of core task components and a set of peripheral task components,
the core task components identified on the basis of time available to the server for responding to a plurality of requests;
the server responding to the request by performing the core task components of the identified task;
the server collecting request context data relevant to the request and the identified task;
the server returning a result to the requesting client based on having performed the core task components of the identified task;
the server constructing a message to include the collected request context data and the returned results;
the server sending the constructed message to an asynchronous message collector;
the server sending the constructed message to a first asynchronous message collector;
a forwarding server taking up the message from the first collector and forwarding same to one of a plurality of second asynchronous message collector based on a load balancing algorithm, each second collector having an asynchronous message processor associated therewith;
the asynchronous message processor associated with the sent-to second collector taking up and processing the message therefrom to perform one or more peripheral task components of the identified task based on the message.

17. The storage medium of claim 16, wherein the operations further comprise the asynchronous message processor taking up and processing the message from the collector to perform one or more peripheral task components of the identified task based on the message.

18. The storage medium of claim 16, wherein the server collects request context data including input parameters on the request, and data generated as a result of performing the core task components of the identified task.

19. The storage medium of claim 16, wherein the operations further comprise the server identifying the task corresponding to the request, the identified task including core task components including task components identified as necessary to be performed prior to responding to the corresponding request.

20. The storage medium of claim 16, wherein the operations further comprise the server identifying the task corresponding to the request, the identified task including core task components including task components identified as relatively low-bandwidth tasks that do not adversely impact response time.

21. The storage medium of claim 16, wherein the operations further comprise the server identifying the task corresponding to the request, the identified task including peripheral task components including task components identified as relatively high-bandwidth tasks that could adversely impact response time.

22. The storage medium of claim 16, wherein the operations further comprise the server collecting the request context data and organizing same according to a pre-defined schema recognizable to each message processor.

23. The storage medium of claim 16, wherein the operations further comprise the server sending the constructed message to the asynchronous message collector according to a reliable message technology protocol to ensure delivery of the message to the collector.

24. The storage medium of claim 16, wherein the operations further comprise one of a plurality of message processors associated with the collector taking up and processing the message from the collector.

25. The storage medium of claim 16, wherein the operations further comprise the server collecting request context data defining the peripheral task components to be performed by the message processor, and the message processor taking up and processing the message from the collector to perform the peripheral task components defined by the collected request context data of the message.

26. The storage medium of claim 16, wherein the operations further comprise:
the server sending the constructed message to one of a plurality of asynchronous message collectors, each collector having an asynchronous message processor associated therewith;
the asynchronous message processor associated with the sent-to collector taking up and processing the message therefrom to perform one or more peripheral task components of the identified task based on the message.

27. The storage medium of claim 16, wherein the operations further comprise:
the server sending the constructed message to a plurality of asynchronous message collectors, each collector having an asynchronous message processor associated therewith;
the asynchronous message processor associated with each sent-to collector taking up and processing the message therefrom to perform one or more peripheral task components of the identified task based on the message.

28. The storage medium of claim 16, wherein the operations further comprise:

the server encrypting the constructed message and sending the encrypted message to the asynchronous message collector;

the asynchronous message processor taking up and decrypting the message from the collector and processing the decrypted message.

29. The storage medium of claim 16, wherein the operations further comprise:

the server signing the constructed message and sending the signed message to the asynchronous message collector;

the asynchronous message processor taking up and verifying the signed message from the collector and processing the verified message.

30. The storage medium of claim 16, wherein the operations are for a rights management (RM) server in an RM system to respond to a request for an RM service from an RM client.

\* \* \* \* \*